United States Patent Office 3,010,937
Patented Nov. 28, 1961

3,010,937
PROCESS FOR STABILIZING POLYMERS OF MONOOLEFINS
Ernst Roos, Koln-Flittard, Friedrich Lober and Otto Bayer, Leverkusen-Bayerwerk, and Hans Scheurlen, Leverkusen, Germany, assignors to Farbenfabriken Bayer Aktiengesellschaft, Leverkusen, Germany, a corporation of Germany
No Drawing. Filed Dec. 15, 1959, Ser. No. 859,557
Claims priority, application Germany Dec. 19, 1958
8 Claims. (Cl. 260—45.7)

This invention relates to the stabilization of polyolefines and to compounds especially suitable as stabilizing agents.

It is known that polyolefines, such as for example polyethylene, polypropylene and polybutylene, undergo undesirable changes under the influence of atmospheric oxygen and ozone, especially with the simultaneous effect of light and heat. These changes lead to a deterioration in the appearance and the mechanical properties of the plastics produced from such polyolefines and make them unsuitable for many purposes.

Consequently, attempts have already been made to prevent these ageing phenomena in polyolefines by adding antioxidizing agents and stabilizers. In addition to the antioxidizing agents conventionally used for natural and synthetic rubbers, such as for example alkyl phenols, p-phenylene diamine and naphthylamine derivatives, there have inter alia also been proposed for stabilizing the polyolefine substances containing sulfur, such as thiuram disulfides, phenol sulfides and mercaptans. These compounds however, sometimes have an insufficient effect or they produce other disadvantages, for example discoloration of the polymers or in the formation of considerable odor during the preparation of the mixture and the processing thereof.

It has now been found that thioacetals stabilize polyolefines in an outstanding manner against the harmful influence of atmospheric oxygen and ozone, which effect is further intensified by the simultaneous action of light and heat.

The thioacetals to be used according to the invention, which can contain the grouping $$-S-CH-S-$$
$$\phantom{-S-}|\phantom{-S-}$$

once or several times in the molecule, can be produced by known processes, for example by condensation of mercaptans and aldehydes in the molar ratio 2:1 in the presence of acid catalysts. They are generally obtained as colorless liquids or solid substances and, in contrast to the corresponding mercaptans, do not have any smell, or only a slight and not unpleasant smell.

Suitable thioacetals can be produced from aliphatic, cycloaliphatic, araliphatic, aromatic or heterocyclic mercaptans and aldehydes. As typical representatives of these two classes of compounds, the following are to be mentioned: formaldehyde, acetaldehyde, propionaldehyde, n-butyraldehyde, isobutyraldehyde, heptylaldehyde, benzaldehyde, salicylaldehyde, p-hydroxybenzaldehyde, furfurol, glyoxal, terephthalaldehyde; hydrogen sulfide, methylmercaptan, ethyl mercaptan, propyl mercaptan, n-butylmercaptan, tert.-butyl mercaptan, nonyl mercaptan, n-dodecyl mercaptan, tert.-dodecyl mercaptan, iso-dodecyl mercaptan, benzyl mercaptan, o-chlorobenzyl mercaptan, thiophenol, thiocresol, p-chlorothiophenol, trichlorothiophenol, α- and β-thionaphthol.

Those thioacetals which have good compatibility with the olefines and have a low vapour pressure at the necessary processing temperatures are particularly suitable.

The following Table I contains examples of some thioacetals which can be used in the process of the invention:

TABLE I (1) Trithioformaldehyde

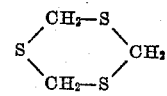

(2) Formaldehyde-bis-(n-, tert.- or iso-)dodecylthioacetal $$C_{12}H_{25}-S-CH_2-S-C_{12}H_{25}$$

(3) Acetaldehyde-bis-(n-, tert.- or iso-)dodecylthioacetal

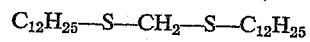

(4) Propionaldehyde-bis-(n-, tert.- or iso-)dodecylthioacetal

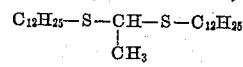

(5) n-Butyraldehyde-bis-(n-, tert.- or iso-)dodecylthioacetal

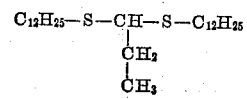

(6) Isobutyraldehyde-bis-(n-, tert.- or iso-)dodecylthioacetal

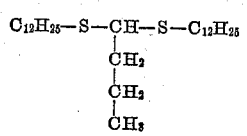

(7) Formaldehyde-bis-benzylthioacetal

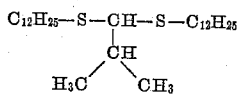

(8) Formaldehyde-bis-o-chlorobenzylthioacetal

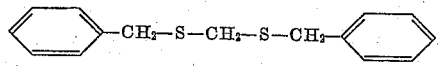

(9) Acetaldehyde-bis-benzylthioacetal

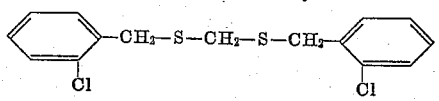

(10) Isobutyraldehyde-bis-phenylthioacetal

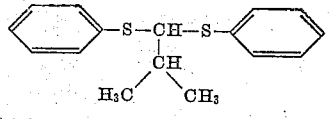

(11) Benzaldehyde-bis-(n-, tert.- or iso-)dodecylthioacetal

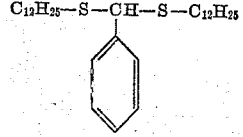

(12) Salicylaldehyde-bis-(n-, tert.- or iso-)dodecylthioacetal

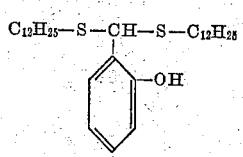

(13) p-Oxybenzaldehyde-bis-(n-, tert.- or iso-)dodecylthioacetal

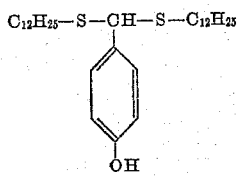

(14) Benzaldehyde-bis-benzylthioacetal

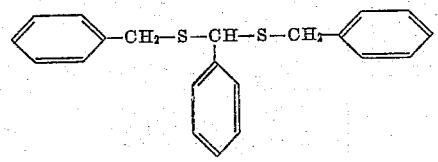

(15) Salicylaldehyde-bis-benzylthioacetal

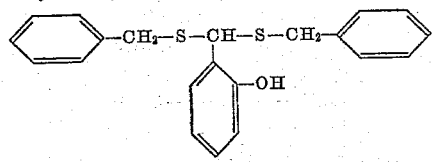

(16) p-Oxybenzaldehyde-bis-benzylthioacetal

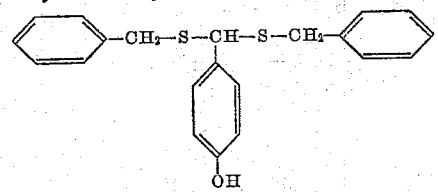

(17) Terephthalaldehyde-bis-tert.-butylthioacetal

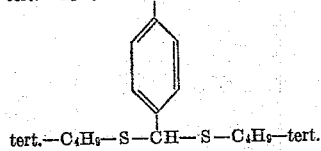

(18) Trithiobenzaldehyde

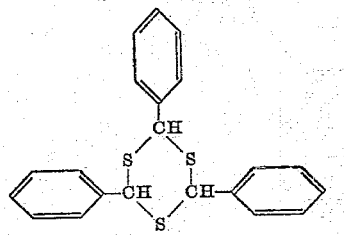

(19) Furfurol-bis-(n-, tert.- or iso-)dodecylthioacetal

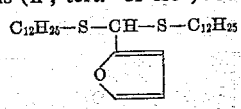

(20) Furfurol-bis-benzylthioacetal

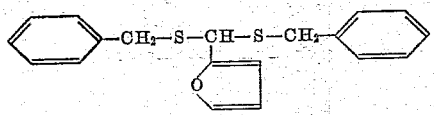

By n-dodecyl radicals, there are understood unbranched carbon chains with 12 carbon atoms, while the tert.-dodecyl radicals are derived from triisobutylene and the isododecyl radicals from tetrapropylene.

From the above formulae it can be seen that preferably those thioacetals are used which correspond to the formula:

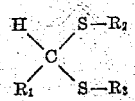

The radicals have preferably the following meaning:

$R_1$ represents hydrogen, alkyl, preferably lower alkyl, aryl or heterocyclic radicals, $R_2$ and $R_3$ represent alkyl, aralkyl or aryl radicals. $R_2$ and $R_3$ can be connected also directly whereby this connecting link can contain hetero atoms such as sulfur. The radicals can contain substituents, for example halogen or hydroxy or alkoxy groups.

The quantity of thioacetals used when stabilizing polyolefines is 0.01 to 10% by weight, advantageously 0.02 to 5% by weight, based on the polymer. In many cases, it is advisable to use the thioacetals in admixture with one another or with other stabilizers. They develop their stabilizing action in both the pure polymers and also in mixtures of the polymers with carbon black, aluminum powder, light colored fillers and dyes.

The thioacetals are incorporated in the usual way, for example by mixing the pulverous polyolefines with the stabilizers in a kneader, ball mill or on the roll mill. A particularly uniform distribution of the components is produced if the mixture is conducted through a heatable extrusion press at a temperature above the melting point of the polyolefines. The thioacetals can on the other hand also be mixed in the form of solutions in low-boiling solvents with the polyolefine powder and also show a uniform distribution after the low-boiling fractions have been evaporated.

The following examples further illustrate the invention without limiting it thereto.

*Example 1*

5 grams of each of the compounds mentioned in Table II were mixed on a roll mill heated to 160° C. in each case with 1 kg. of a polyethylene with the molecular weight 80 to 100,000, produced by the low-pressure process. The mixture was drawn out as a sheet, granulated and molded with an injection molding machine to form standard small rods with the dimensions 50 x 6 x 4 mm. After these test specimens had been kept for periods from 0 to 32 days in a cylinder at an oxygen pressure of 21 atm. at 70° C., the change in their notched impact strength after the action of oxygen was tested in accordance with DIN 53453.

The following Table II shows the notched impact strength of the polyethylene samples stablized with thioacetals, in comparison with a polyethylene sample without stabilizer.

TABLE II

| Additive | No. of Test Specimens | Notched impact strength, cm.·kg./cm.² | | |
|---|---|---|---|---|
| | | before ageing | after 4 days | after 32 days |
| without | 10 | 39.7 | 1.9 | |
| Formaldehyde - bis - tert.- dodecylthioacetal | 10 | 38.5 | 39.3 | 36.2 |
| Acetaldehyde-bis-tert.-dodecylthioacetal | 10 | 40.1 | 39.0 | 35.7 |
| Formaldehyde-bis-benzylthioacetal | 10 | 35.9 | 36.0 | 33.3 |
| Formaldehyde-bis-o-chlorobenzylthioacetal | 10 | 38.1 | 39.2 | 32.3 |
| Benzaldehyde-bis-n-dodecylthioacetal | 10 | 36.5 | 37.2 | 36.0 |
| n-Butyraldehyde-bis-phenylthioacetal | 10 | 35.7 | 36.2 | 35.3 |

Instead of the polyethylene there can be used also polypropylene, e.g. an isotactic polypropylene obtained from propylene with Ziegler catalysts having an atactic content of about 5% and a density of about 0.91 g./cm.³

*Example 2*

5 grams of each of the compounds indicated in Table III were incorporated, as described in Example 1, into a polyethylene with the molecular weight of 50 to 60,000 prepared by the low-pressure process and the test specimens produced therefrom as described in Example 1 were subjected to oxygen ageing.

TABLE III

| Additive | No. of Test Specimens | Notched impact strength, cm.-kg./cm.² | | |
|---|---|---|---|---|
| | | before ageing | after 4 days | after 32 days |
| without | 10 | 15.9 | 2.9 | |
| n-Butyraldehyde-bis-n-dodecylthioacetal | 10 | 13.1 | 12.5 | 15.6 |
| i-Butyraldehyde-bis-n-dodecylthioacetal | 10 | 15.0 | 13.1 | 15.0 |
| 2-Oxybenzaldehyde-bis-n-dodecylthioacetal | 10 | 15.6 | 16.3 | 15.0 |
| Furfurol-bis-n-dodecylthioacetal | 10 | 14.2 | 13.8 | 13.7 |
| Benzaldehyde-bis-tert.-butylthioacetal | 10 | 13.5 | 12.2 | 10.8 |

We claim:

1. In the process for stabilizing polymers of monoolefines against the influence of oxygen and ozone, the improvement which comprises using thioacetals as stabilizing agents in an amount of 0.01–10% by weight based on the polymer.

2. The process as claimed in claim 1, wherein benzaldehyde-bis-n-dodecylthioacetal is used as stabilizing agent.

3. The process as claimed in claim 1, wherein isobutyraldehyde-bis-n-dodecylthioacetal is used as stailizing agent.

4. The process as claimed in claim 1, wherein formaldehyde-bis-benzylthioacetal is used as stabilizing agent.

5. The process as claimed in claim 1, wherein n-butyraldehyde-bis-phenylthioacetal is used as stabilizing agent.

6. Polymers of monoolefins stabilized with thioacetals in an amount of 0.01–10% by weight based on the polymer.

7. Polymers of monoolefins stabilized with benzaldehyde-bis-n-dodecylthioacetal in an amount of 0.01–10% by weight based on the polymer.

8. Polymers of monoolefins stabilized with isobutyraldehyde-bis-n-dodecylthioacetal in an amount of 0.01–10% by weight based on the polymer.

References Cited in the file of this patent

UNITED STATES PATENTS

| 1,950,438 | Carothers et al. | Mar. 13, 1934 |
| 2,727,879 | Vincent | Dec. 20, 1955 |
| 2,794,050 | Thompson | May 28, 1957 |
| 2,882,261 | Marks | Apr. 14, 1959 |